July 5, 1927.
R. A. FATOUX
1,634,656
COACH BODY OF AUTOMOBILES
Filed Dec. 1, 1925
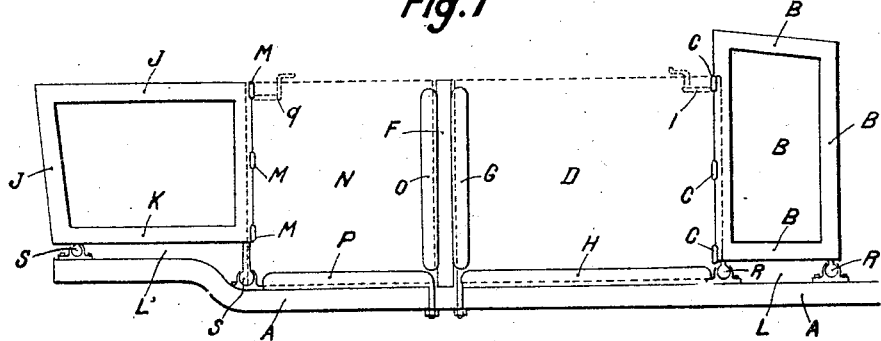
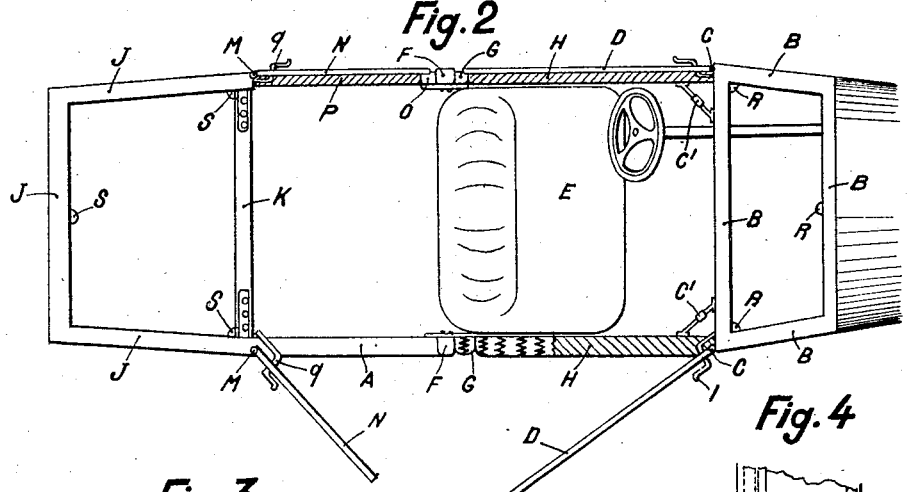
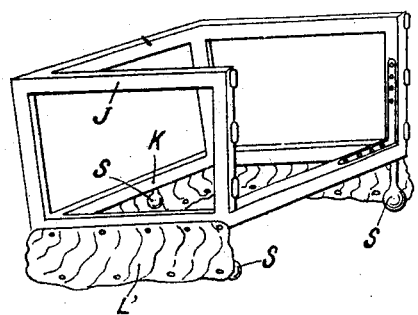
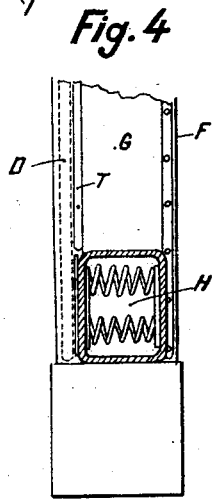
Witnesses:
Gentizon Robert
Inventor:
Raymond Albert Fatoux
per Fred F. Barlow
Attorney Patented July 5, 1927.

1,634,656

UNITED STATES PATENT OFFICE.

RAYMOND ALBERT FATOUX, OF NEUILLY-SUR-SEINE, FRANCE.

COACH BODY OF AUTOMOBILES.

Application filed December 1, 1925, Serial No. 72,556, and in France December 23, 1924.

This invention relates to a new construction or arrangement by means of which an automobile coach body can be produced which is lighter, more flexible, more durable and less costly than coach bodies of the usual construction, the rigid shell usually made in a single piece being replaced by multiple and independent shell elements, which are connected by resiliently arranged doors, in such a way that any variation in alignment between the various elements is compensated.

The construction or arrangement comprises a front rigid shell and a rear rigid shell enclosing the rear seats and independent of the first mentioned shell, these two shells being connected by one or two pairs of doors (with the inter-position in the latter case of a pair of fixed columns), compensation being made for any variations in alignment which may occur between the various elements by resilient members, against which the lower horizontal and the free vertical surfaces of the doors are adapted to rest. Or the said doors may even be simply of special construction rendering them flexible.

The accompanying drawings illustrate by way of example one method of carrying out the invention.

Fig. 1 is a diagrammatic side elevation of a portion of the chassis and coach body of an automobile constructed according to the invention.

Fig. 2 is a diagrammatic plan of Fig. 1.

Fig. 3 is a perspective view of the frame of the rear element or shell of the coach body.

Fig. 4 is an enlarged detail hereinafter referred to.

Referring first to the front portion of the vehicle, A is the chassis of the automobile (see Figs. 1 and 2). B is the bonnet, torpedo front or the like arranged in the usual manner. It is constructed in the customary fashion but preferably mounted by means of three ball joints R. The lower side members of this shell are connected to the chassis of the automobile by means of a collapsible strip, of imitation leather for instance L, which covers the opening without interfering with any slight displacements of the shell. The front shell portion B thus constitutes a separate and distinct element from the rest of the coach body, the ordinary side struts being suppressed. This shell B is provided with vertical hinge pins C upon which are pivotally mounted the forward doors D. The front seats are located at E, directly upon the chassis of the automobile, as is the usual practice in the case of chassis which are being tested and with certain racing cars.

Referring now to the pillar elements, these pillars F are located at each side of the chassis and extend to the height of the backs of the front seats. Each pillar F, as indicated at Figs. 1 and 2, carries a resilient member, such for instance as a vertical pad G of elongated shape, the details of which pad can be easily seen from Fig. 4. H is another resilient member, similar to that just described, and attached to the longitudinally extending frame member of the chassis. The door D, when it is closed comes with its horizontal lower surface against the horizontal pad and with its vertical rear surface against the vertical pad.

The door may be kept in position when closed by a bolt device or some kind of catch I mounted in the neighbourhood of the pivotal axis of the said door and not at the opposite side thereof as is generally the case. This arrangement for holding the door in the closed position may even be constituted by an extension member $C^1$ with which the door interlocks in the closed position. This device holds the door fixed on its axle in the closed position as if the axle were gripped, the door being forced with resilient pressure against the pads which are slightly compressed.

A certain amount of play is provided between the vertical rear edge of the door and the chassis. It is obvious that any slight variations in level which may occur when the vehicle is in motion between the forward shell B on which the door is mounted, and the pillar F against which it rests will be automatically allowed for and that without noise by a slight frictional movement of the door over the padded surface T of the pad. The door is not jammed against the pads, because it only rests against them.

Referring now to the third element of the shell this comprises a member such as J mounted at the rear of the chassis, see Figs. 1 and 3, the mounting being effected preferably by means of three ball joints S. This shell, being rigid, may, as is also the case with the doors on the front element, be covered with thin plates or with wood. The space between the lower longerons or side members K and the chassis is covered by means of a collapsible strip L¹ of leather or imitation leather, which renders the coach body rain or dust proof without interfering with the slight displacements of the shell.

This last mentioned shell carries the rear doors N upon hinges M which doors extend between the shell and the pillars F. These pillars are provided on their rear surface with vertical pads O, and the chassis is provided with horizontal pads P. The doors N are provided with locking means Q in the neighbourhood of their pivotal axes, and the shell J is thus connected to the pillars F in the same manner as the front shell B is connected to the said pillars F.

It is evident that where it is desired that the doors should open in the opposite direction to the one indicated, the hinges might be mounted upon the pillars F. The vertical members of the rear shell and of the front shell would then carry the vertical pads. In some cases one of the doors might be hinged to a pillar F, the other being mounted as indicated at Fig. 1.

The invention is also applicable to coach bodies only provided with two doors, namely coach bodies with two, three or four seats carried upon short chassis. The construction is then that which would be obtained by pushing the shell J in a forward direction, its front standards taking the place of the pillars F (which would then not be employed) and carrying the vertical pads.

The invention is also applicable to all other kinds of coach bodies.

It is also quite obvious that the pads provided with springs as shown might be replaced by pneumatic or other cushions, or that they might even be suppressed altogether, the doors in that case being constructed so that they would be resilient. They might for instance be made from flexible metallic plates or from resilient wooden frameworks with imitation leather stretched over the same.

What I claim and desire to secure by Letters Patent of the United States of America is:—

1. In an automobile, a coach body consisting of a forward shell element mounted on the chassis by means of ball joints, a rear shell element mounted on the said chassis also by means of ball joints, doors pivotally mounted on one of the shell elements and extending toward the other element and resilient means for preventing the doors jamming owing to the independent movements of the elements, substantially as described.

2. In an automobile having a coach body as claimed in claim 1, a construction in which the resilient means for preventing the jamming of the doors consists of resilient cushions attached to a vertical member and a horizontal member against which the inner surface of the door in the neighbourhood respectively of the free vertical edge remote from the hinge and the lower edge is adapted to rest with slight frictional pressure, substantially as and for the purposes set forth.

In witness whereof I affix my signature.

RAYMOND ALBERT FATOUX.